US007850767B2

(12) United States Patent
Bizien

(10) Patent No.: US 7,850,767 B2
(45) Date of Patent: Dec. 14, 2010

(54) ANTI-FOAMING DEGASSING DEVICE FOR USE IN FUEL DISPENSING EQUIPMENT, PARTICULARLY IN BIOFUEL DISPENSING EQUIPMENT

(75) Inventor: Franck Christian Bizien, Potigny (FR)

(73) Assignee: Tokheim Holding BV, Ad Bladel (NL)

( * ) Notice: Subject to any disclaimer, the term of this patent is extended or adjusted under 35 U.S.C. 154(b) by 324 days.

(21) Appl. No.: 12/187,492

(22) Filed: Aug. 7, 2008

(65) Prior Publication Data

US 2009/0038478 A1     Feb. 12, 2009

(30) Foreign Application Priority Data

Aug. 8, 2007     (FR)     .................................. 07 56992

(51) Int. Cl.
*B01D 19/02*     (2006.01)
(52) U.S. Cl. ............................... 96/174; 96/176; 96/207
(58) Field of Classification Search .................... 96/176, 96/177, 178, 179, 180, 174, 207, 215
See application file for complete search history.

(56) References Cited

U.S. PATENT DOCUMENTS 3,159,310 A * 12/1964 Rafferty .................. 222/63
4,978,374 A    12/1990 Janssen et al.
5,902,382 A *  5/1999 Campain et al. ........... 96/161
2009/0120296 A1* 5/2009 Saito ......................... 96/174

FOREIGN PATENT DOCUMENTS

EP     0357513 A1     3/1990
FR     2730484 A1     8/1996

OTHER PUBLICATIONS

The Search Report mailed Apr. 4, 2008 in priority application No. FR0756992.

* cited by examiner

*Primary Examiner*—Duane Smith
*Assistant Examiner*—Douglas J Theisen
(74) *Attorney, Agent, or Firm*—Drinker Biddle & Reath LLP

(57) ABSTRACT

An anti-foaming degassing device for use in fuel dispensing equipment, having:
 a circulating pump (1) for the fuel,
 a vortex degassing enclosure (2) connected to the outlet of the pump (1) and provided with a lateral outlet pipe (8) for the degassed fuel and with an axial outlet pipe (9) for a gas-enriched fraction of fuel,
 a separating vessel (3) connected to the axial outlet pipe (9) in which the liquid fuel is separated by gravity before being transferred back to the pump (1), and
 control means (20) making it possible to vary the flow rate of the fraction collected by the axial outlet pipe (9) according to its gas content.

The axial outlet pipe (9) opens in the lower part of the separating vessel (3), into the gravity-separated liquid fuel, in such a way as to prevent the formation of foam in this vessel.

7 Claims, 2 Drawing Sheets

ANTI-FOAMING DEGASSING DEVICE FOR USE IN FUEL DISPENSING EQUIPMENT, PARTICULARLY IN BIOFUEL DISPENSING EQUIPMENT

The present invention relates to a device for degassing dispensed liquid, for use in fuel dispensing equipment, and particularly in equipment for dispensing biofuel.

Fuel dispensing equipment is commonly fitted with degassing systems to ensure that the measurement of the volume of fuel delivered to the user actually relates to the liquid fuel and not to a mixture of liquid fuel and gas (in the form of air and hydrocarbon vapour).

The acceptable percentage of gas in the liquid is defined, in particular, by Regulation R 117 of the OIML (the International Organization of Legal Metrology).

Conventionally, a degassing system of this type includes:
a pump for circulating the fuel drawn from a storage tank,
a degassing enclosure, particularly of the vortex type, supplied with a mixture of liquid fuel and gas by an inlet pipe connected to the outlet of the pump, and provided with two outlet pipes, namely a lateral pipe for the degassed liquid fuel and an axial pipe for a gas-enriched fuel fraction, and
a separating vessel at atmospheric pressure, connected to the axial outlet pipe of the degassing enclosure, in which the liquid fuel contained in the gas-enriched fraction is separated by gravity before being transferred again towards the suction end of the pump, this separating vessel being provided with a safety aperture enabling the separated gases to be discharged to the outside.

As a general rule, the degassing enclosure has an elongated cylindrical shape such that a helical flow of the mixture introduced by the inlet pipe can be created, and such that the degassed fuel can be collected through the lateral outlet pipe and the gas-enriched fraction can be collected through the axial outlet pipe.

An example of a degassing system of this type is described in EP 0 357 513.

According to this prior publication, the degassing enclosure is associated with detection means for controlling the dispensing of liquid fuel according to its gas content, and for stopping it if necessary if the gas content exceeds a predetermined level.

The disadvantage of this system arises from the fact that, if the fuel entering the degassing enclosure contains very little gas, which is the most frequent case, the fraction collected by the axial outlet pipe and transferred towards the separating vessel retains a low gas content.

This fraction of fuel has to remain in the separating vessel for a certain period before being recycled towards the pump inlet, and this considerably decreases the efficiency of the dispensing installation, especially since this liquid with a low gas content tends to cause foam formation in the pump because of its agitation.

For this reason, it would be desirable to be able to reduce the flow rate of liquid fuel and gas mixture collected by the axial outlet pipe of the degassing enclosure, but this is not always possible in practice, since, if the fuel accidentally has a high gas content, this outlet pipe must have a large enough diameter to permit the effective degassing of this fuel.

To overcome this problem, FR 2 730 484 proposes to connect control means to the axial outlet pipe of the degassing enclosure, making it possible to vary the flow rate of the gas-enriched fraction collected by the pipe according to its gas content.

In this way, a large flow of fuel can be collected and transferred into the separating vessel if its gas content is high, while the flow is reduced if this fuel only has a low gas content.

Such a degassing device is generally satisfactory when fitted to equipment for dispensing petroleum-based fuels.

However, this is not the case with equipment for dispensing biofuels, particularly fuels based on alcohols such as ethanol or based on esters, such as biodiesel or domestic fuel oil without antifoaming additives.

The decreasing availability of petroleum, resulting in an increase in its price and the increasing awareness of problems of environmental protection, has stimulated work on the development of such biofuels, which are economically viable substitute energy sources.

In the specific field of motoring, biofuels based on alcohols, generally obtained from sugar cane, beets or cereals such as wheat, or based on esters derived from vegetable oils such as corn, colza or palm oil, form particularly useful alternatives to petroleum, especially since they provide a profitable use for agricultural waste products and enable cultivated areas to be expanded.

Consequently, increasing numbers of service stations are provided with dispensing equipment for biofuels, which are generally made from a mixture of vegetable-based compounds and petroleum-based fuels, such as the fuel called "E85" which essentially contains about 85% alcohol, particularly ethanol, and 15% standard petroleum fuels, or the biodiesel "B30" which contains 30% derivatives of agricultural origin and 70% petroleum derivatives.

However, the composition of biofuels of this type can vary, for example, according to their production site and seasonal factors, and they frequently contain methanol, higher alcohols such as propanol or butanol, esters from fermentation residues, acetic acid and a more than negligible quantity of water, in addition to variable proportions of petroleum-based fuels, ethanol and esters; they also contain additives for preserving the fuels over a period of time.

Consequently, it has been found that certain fuels sometimes show a strong tendency to generate foams which require a longer decantation time in the separating vessel before concentration into liquid form.

In the known degassing devices of the aforementioned type, the axial outlet pipe of the degassing enclosure conventionally opens into the upper part of the separating vessel, above the level of the gravity-separated liquid fuel, this arrangement being generally satisfactory in the case of petroleum-based fuels.

However, since the diameter of this pipe must be kept as small as possible in order to meet the aforementioned requirements and limit the "leakage" flow rate, this configuration may lead to problems if the fuel transferred is a biofuel, particularly a biodiesel-based one.

This is because, in this case, the liquid fuel and gas mixture can form a foam which, depending on the respective proportions of gas and liquid, can rise to such a height that it fills the separating vessel until it causes overflows through the safety aperture.

This also gives rise to risks of an overflow of this foam towards the circulating pump through the return pipe for the gravity-separated liquid fuel, which can severely disrupt the operation of the fuel dispensing installation, particularly by causing pump failure and a loss of pumping efficiency.

The object of the present invention is to overcome these disadvantages by proposing a degassing device for fuel dispensing equipment, particularly equipment for dispensing biofuel of the aforementioned type, in which the control means connected to the axial outlet pipe of the degassing enclosure cannot contribute to the formation of foam.

According to the invention, a device of this type is characterized in that the axial outlet pipe of the degassing enclosure opens into the lower part of the separating vessel, into the liquid fuel which has already been separated by gravity, so as to prevent the formation of foam in this vessel.

The liquid fuel and gas mixture flowing from the degassing enclosure is thus transferred into the lower part of the separating vessel, which is filled with liquid fuel, so as to prevent or at least limit the formation of foam.

According to a particularly advantageous feature of the invention, the control means are composed of a control cylinder fitted, on the one hand, with a front opening connected to the axial outlet pipe of the degassing enclosure, and with a lateral opening connected to a discharge tube opening in the lower part of the separating vessel, and, on the other hand, with a diaphragm piston which is subject to the action of a return spring and which is sensitive to the mass per unit volume of the gas-enriched fraction of fuel flowing in the axial outlet pipe of the degassing enclosure, and therefore to the quantity of gas present in this fraction, the piston having the function of opening or closing the lateral opening of the control cylinder proportionally to this quantity.

According to this feature, the gas-enriched fraction of fuel flowing in the axial outlet pipe of the degassing enclosure passes through the diaphragm of the piston, which is pushed back by the return spring.

The force exerted on the spring by the piston depends on the pressure drop created by the diaphragm.

This pressure drop P is of the type characterizing a turbulent flow in a diaphragm, and can therefore be represented by the equation $P=K\rho v^2$, in which K is a geometric factor, $\rho$ represents the mass per unit volume of gas-enriched fuel, and v is the flow velocity of this fuel.

The pressure drop P therefore depends on the gas content of the mixture passing through the diaphragm.

Consequently, the position of the piston in the control cylinder depends on the gas content of the gas-enriched fraction of fuel separated in the degassing enclosure.

Depending on this position, the piston opens or closes the lateral opening of the control cylinder proportionally to the quantity of gas present in the fuel.

According to the invention, the control cylinder and/or the diaphragm piston and/or the axial outlet pipe of the degassing enclosure can advantageously be made from brass for pure petroleum products, from stainless steel for fuels with a high biofuel content, or from a suitable plastics material.

According to another feature of the invention, the front face of the control cylinder opposite the front opening is provided with a piston guide pin having a conical end which can seal the diaphragm.

It should be noted that this guide pin has no function in the fuel degassing process but ensures that the diaphragm is properly sealed because of its conical end.

The guide pin thus makes it possible to minimize the internal leaks of liquid towards the lateral opening of the control cylinder in the vicinity of the piston when the piston is pushed back to its furthest extent.

According to the invention, the free end of the discharge tube can open directly into the gravity-separated liquid fuel at the bottom of the recovery vessel.

According to another feature of the invention, the discharge tube can be provided with a filter at its free end.

A filter of this type serves to limit the outlet velocity of the residual gases and to improve their diffusion in the liquid fuel present at the bottom of the separating vessel, in such a way that these gases can rise more rapidly towards the surface.

According to another feature of the invention, the discharge tube is provided with a gas separator of the "plate stack" type at its free end.

This gas separator, which is well known to those skilled in the art, can be used to create a laminar flow of the liquid fuel and force the microbubbles contained therein to group themselves along the walls of the plates and then to recombine into bubbles of a considerable size, which can then rise rapidly by gravitation to the surface of the liquid contained in the separating vessel.

According to another particularly advantageous feature of the invention, the safety aperture of the separating vessel is connected to a system for recovering the exhausted fuel vapours.

Such systems are installed increasingly commonly in fuel dispensers, in order to reduce the risks of air pollution.

It should be noted that this safety aperture can also be provided with a flame arrester or with a calibrated valve which opens only above a predetermined pressure which is compatible with the correct operation of the degassing elements.

The features of the anti-foaming degassing device proposed by the invention are described more fully with reference to the appended non-limiting drawings, in which.

Figure 1:
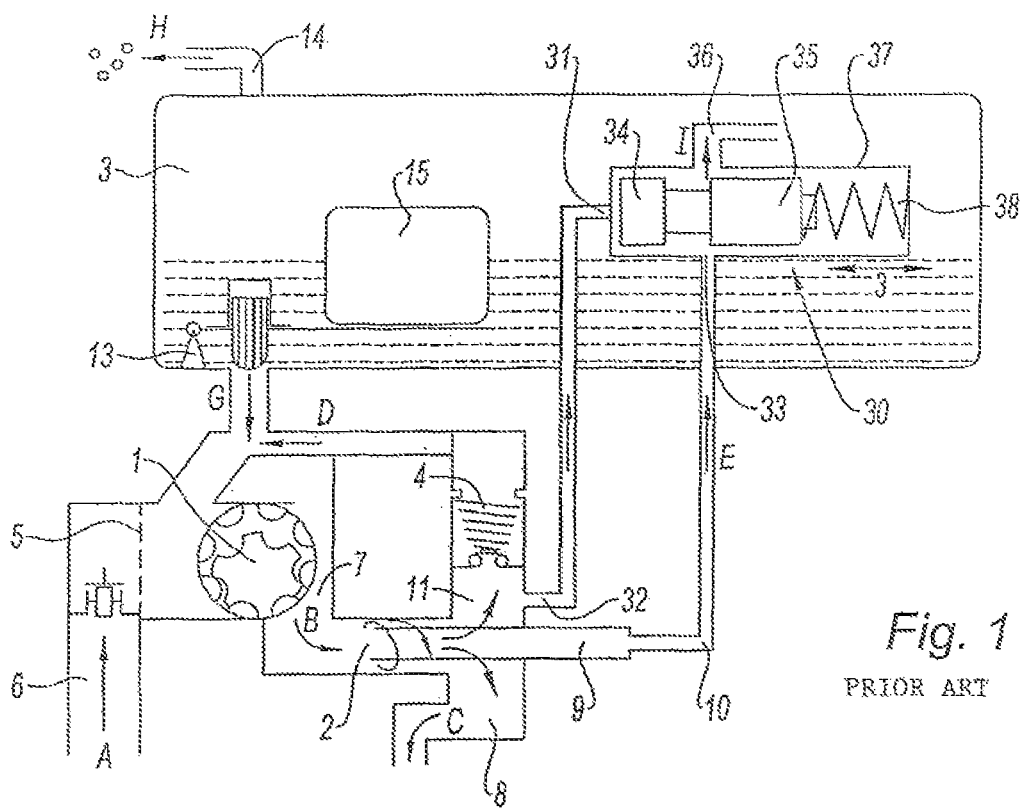
FIG. 1 is a schematic view of a degassing device according to the prior art.

As shown in FIG. 1, the degassing device essentially includes a fuel circulating pump 1, a vortex degassing enclosure 2 and a separating vessel 3.

Figure 2:
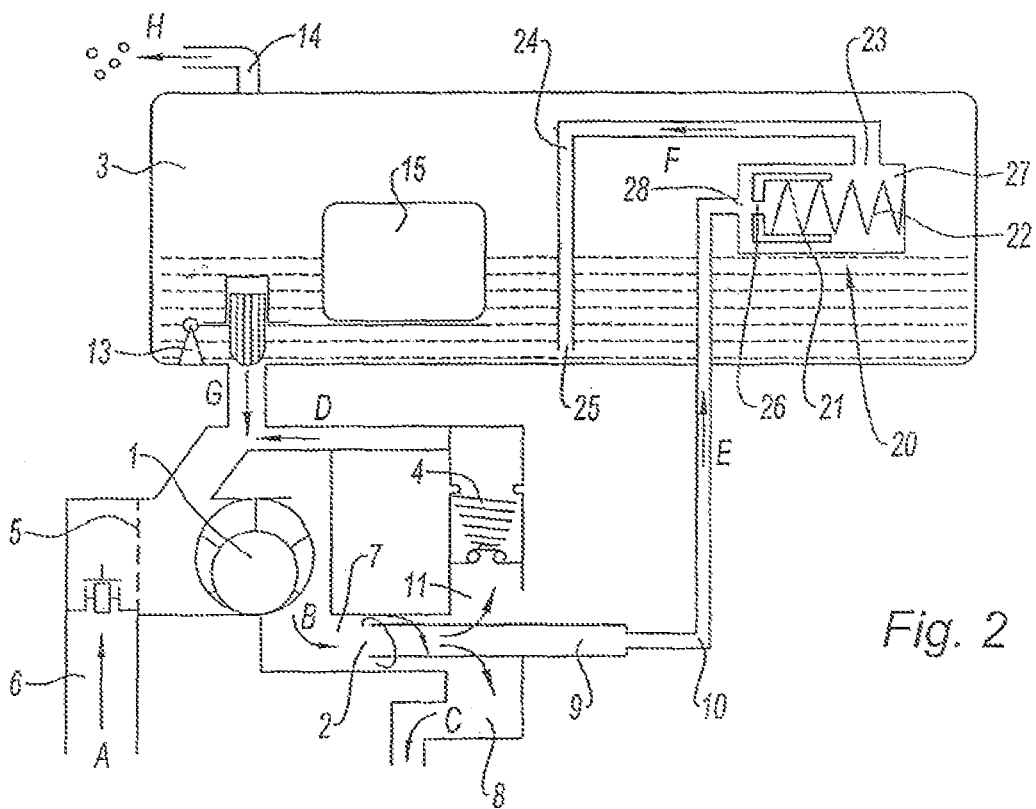
FIG. 2 is a schematic view similar to that of FIG. 1, but showing an anti-foam degassing device according to the invention.

It should be noted that the pump 1 can be of any type, particularly a gear pump as shown in FIG. 1 or a vane pump as shown in FIG. 2.

The pump 1 is associated with a nonreturn valve 4 and a filter 5 in such a way that the fuel can be made to flow from a storage vessel (not shown) in the direction of the arrow A through the supply pipe 6.

The degassing enclosure 2 has an elongated cylindrical shape and is provided with two outlet pipes, namely a lateral pipe 8 and an axial pipe 9; it is designed in such a way as to create in its inner part a helical flow of the liquid fuel and gas mixture in the direction of the arrow B through the inlet pipe 7.

Degassed fuel is collected by the lateral outlet pipe 8 in the direction of the arrow C for filling the tanks of motor vehicles.

A gas-enriched fraction indicated schematically by the arrow E is collected by the axial outlet pipe 9, which is connected to a transfer pipe 10 which itself is connected to the separating vessel by control means 30 which make it possible to vary the flow rate of the gas-enriched fraction collected by the axial outlet 9 according to its gas content.

As shown in FIG. 1, the degassing enclosure 2 also has a recycling circuit or bypass 11, provided with the valve 4, by means of which the excess flow of fuel not delivered into the tank of a vehicle is reintroduced in the direction of the arrow D.

The gas-enriched fraction of fuel leaving the degassing enclosure 2 through the axial outlet pipe 9 is transferred through the transfer pipe 10 in the direction of the arrow E into the control means 30, and then into the upper part of the separating vessel 3 in the direction of the arrow I.

As shown in FIG. 1, these control means 30 are composed of a control cylinder 37 inside which there moves a set of two pistons subjected to the action of a return spring 38, namely a first piston 34 which acts on a second piston 35 which is fixed to it, to open or close a lateral opening 36 through which the air and fuel mixture can be discharged towards the separating vessel 3 in the direction of the arrow I.

The control cylinder 37 also has a first inlet 33 connected to the transfer pipe 10 and a second inlet 31 connected to a pipe 32 connected to the recycling circuit 11.

The reciprocating movement of the set of pistons 34, 35 inside the control cylinder 37 is thus controlled by the pressure difference between the pressure of the liquid, which is assumed to be degassed, flowing in the recycling circuit 11 and the pressure of the gas-enriched fraction flowing in the transfer pipe 10.

As shown in FIG. 1, the liquid fuel contained in the fraction transferred to the upper part of the separating vessel 3 by the opening of the lateral discharge opening 36 in the direction of the arrow I is separated from the gas by gravity, and is collected in the lower part of this vessel.

A valve 13, actuated by a float 15, enables the liquid fuel decanted in this way to be recycled in the direction of the arrow G towards the inlet of the pump 1.

The float 15 is progressively elevated by the liquid fuel present in the lower part of the separating vessel 3, and automatically opens the valve 13 when this liquid has reached a predetermined level.

As shown in FIG. 1, the separating vessel 3 is also provided with a safety aperture 14 for discharging the separated gases to the outside in the direction of the arrow H.

This safety aperture 14 is advantageously connected, in a way not shown in the drawings, to a system for recovering the exhausted fuel vapours.

The control means 30 fitted to the device shown in FIG. 1 are generally satisfactory in the field of degassing of petroleum-based fuels, but they are not sufficiently effective in the presence of fuels which can generate larger quantities of foam.

Figure 3:
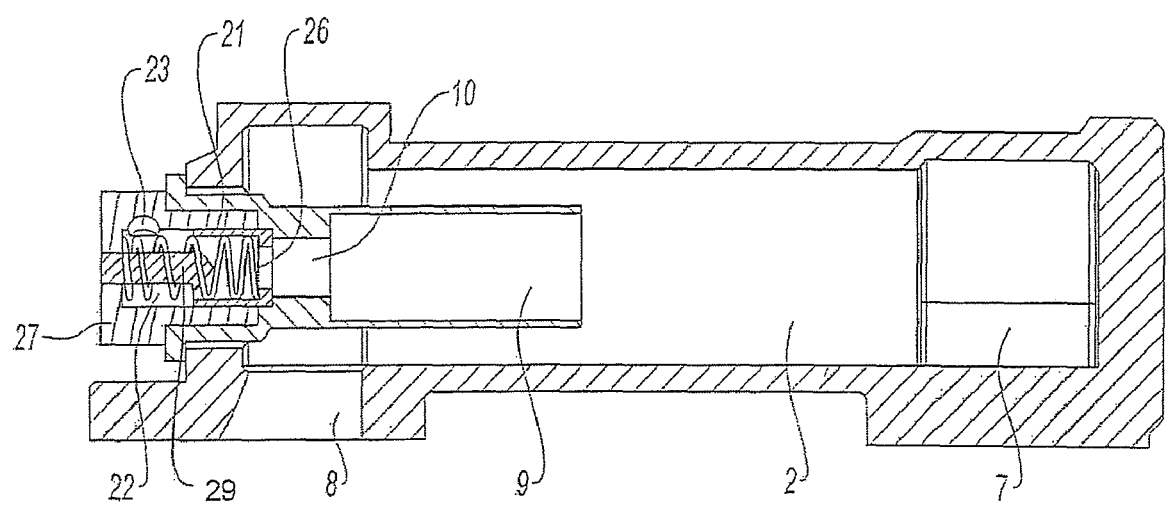
FIG. 3 is a detail view of the degassing enclosure and of the control means.

The control means 20 fitted to the anti-foaming degassing device shown in FIGS. 2 and 3 enable this disadvantage to be overcome.

It should be noted that, with the exception of these control means 20, the other elements of this device are mainly similar to those fitted to the device shown in FIG. 1, and are indicated by the same references.

As shown in FIGS. 2 and 3, the control means 20 are composed of a control cylinder 27 provided with a front opening 28 connected to the transfer pipe 10 which is connected to the axial outlet pipe 9 of the degassing enclosure 2, and with a lateral opening 23 which is connected to a discharge tube 24 opening in the inner part of the separating vessel 3 below the level of the liquid fuel which has already been separated by gravity in the lower part of this vessel.

As shown in FIG. 2, the free end 25 of the discharge tube opens directly into the separated fuel at the bottom of the vessel 3.

The free end 25 of the discharge tube 24 can also be provided, in a way not shown in the drawings, with a filter or a gas separator of the "plate stack" type.

As shown in FIGS. 2 and 3, the control cylinder 27 is provided in its inner part with a piston 21 with a diaphragm 26, which is subjected to the action of a return spring 22 and which can close the lateral opening 23 partially or completely, according to the quantity of gas present in the gas-enriched fraction of fuel flowing in the direction of the arrow E in the pipes 9 and 10.

A guide pin 29 having a conical end, shown in FIG. 3 but not shown in FIG. 2, enables the diaphragm 26 to be sealed when the return spring 22 is pushed back to the furthest extent in order to reduce leakage when the lateral opening 23 is completely closed.

As shown in FIG. 2, the fuel discharged from the control means 20 through the discharge tube 24 in the direction of the arrow F is delivered to the bottom of the recovery vessel 3 below the level of liquid fuel which has already been decanted into this vessel.

The invention claimed is:

1. An anti-foaming degassing device for use in fuel dispensing equipment, particularly in biofuel dispensing equipment, having:
   a pump for circulating the fuel drawn from a storage tank,
   a degassing enclosure, particularly of the vortex type, supplied with a mixture of liquid fuel and gas by an inlet pipe connected to the outlet of the pump, and provided with two outlet pipes, namely a lateral pipe for the degassed liquid fuel and an axial pipe for a gas-enriched fuel fraction,
   a separating vessel at atmospheric pressure, connected to the axial outlet pipe of the degassing enclosure, in which the liquid fuel contained in the gas-enriched fraction is separated by gravity before being transferred again towards the suction end of the pump, this separating vessel being provided with a safety aperture enabling the separated gases to be discharged to the outside, and
   control means connected to the axial outlet pipe of the degassing enclosure to make it possible to vary the flow rate of the gas-enriched fraction collected by this pipe according to its gas content, characterized in that the axial outlet pipe of the degassing enclosure opens in the lower part of the separating vessel, into the gravity-separated liquid fuel, in such a way as to prevent the formation of foam in this vessel.

2. A device according to claim 1, characterized in that the control means are composed of a control cylinder fitted, on the one hand, with a front opening connected to the axial outlet pipe of the degassing enclosure, and with a lateral opening connected to a discharge tube opening in the lower part of the separating vessel, and, on the other hand, with a piston having a diaphragm which is subjected to the action of a return spring and which is sensitive to the mass per unit volume of the gas-enriched fraction of fuel flowing in the axial outlet pipe of the degassing enclosure, and therefore to the quantity of gas present in this fraction, the piston having the function of opening or closing the lateral opening of the control cylinder proportionally to this quantity.

3. A device according to claim 2, characterized in that the front face of the control cylinder opposite the front opening is provided with a guide pin for the piston, having a conical end which can seal the diaphragm.

4. A device according to claim 2, characterized in that the discharge tube is provided with a filter at its free end.

5. A device according to claim 2, characterized in that the discharge tube is provided with a gas separator of the "plate stack" type at its free end.

6. A device according to claim 1, characterized in that the safety aperture of the separating vessel is connected to a system for recovering the exhausted fuel vapours.

7. A device according to claim 2, characterized in that at least one of the control cylinder, and the piston with a diaphragm, and the axial outlet pipe of the degassing enclosure is made from brass, from stainless steel, or from a suitable plastics material.

* * * * *